United States Patent [19]

Proctor

[11] Patent Number: 5,100,562
[45] Date of Patent: Mar. 31, 1992

[54] REFRIGERANT RECYCLING SYSTEM

[75] Inventor: Robert H. Proctor, Baltimore, Md.

[73] Assignee: M/E Automotive Corporation, St. Louis, Mo.

[21] Appl. No.: 621,276

[22] Filed: Nov. 30, 1990

[51] Int. Cl.⁵ .................... B01D 19/00; B01D 35/18
[52] U.S. Cl. .................... 210/774; 210/180; 210/182; 210/184
[58] Field of Search ............ 210/774, 175, 180, 181, 210/182, 184, 186, 187; 62/532, 533

[56] References Cited
U.S. PATENT DOCUMENTS
3,729,414  4/1973  Harris et al. .................... 210/774

*Primary Examiner*—Frank Sever
*Attorney, Agent, or Firm*—Leonard Bloom

[57] ABSTRACT

A highly efficient refrigerant purification device for removing moisture, oil, particulates, non-condensible impurities and other contaminants from a refrigerant, thereby allowing maximum recovery of the refrigerant in a refrigeration system, the refrigerant being in full compliance with regulatory standards. The device can be easily adapted to purify a wide variety of refrigerants, and the device is organized in a logical arrangement which utilizes a minimum number of parts.

40 Claims, 6 Drawing Sheets

REFRIGERANT RECYCLING SYSTEM

BACKGROUND OF THE INVENTION

1. Field of the invention

The present invention relates to refrigerant recycling and recovery, and more particularly to a method and apparatus for purifying refrigerant from a vapor compression refrigeration system.

2. Description of the Background

The issue of environmental protection has reached the forefront of public awareness, and one pervading problem is the dwindling ozone layer. The release of certain refrigerants into the atmosphere is contributing to the problem, and an extreme public outcry has resulted. Consequently, regulations governing the disposal of such ozone depleting refrigerants are becoming increasingly strict, and severe taxes are being imposed on the sale of such refrigerants. These reforms and others have created a significant market for refrigerant recycling and reclamation equipment. Such equipment is now used extensively in the automotive industry, and it is finding its place in other industries as well. A small number of conventional systems are currently available which attach to air conditioning or refrigeration systems for cleaning and filtering refrigerant to a point where it meets regulatory standards for use. In addition to these refrigerant recycling and reclamation systems, alternate refrigerants are being developed which decompose more easily and have less effect on the ozone layer. This new generation of refrigerants (including ternary blends and R134A) are designed to exhibit similar properties as their predecessors (such as R12). However, the expanding variety of refrigerants is creating a problem with recycling and reclamation equipment.

The different types of refrigerants make it impractical to use conventional recycling and reclamation equipment in the field. This is because a different piece of equipment must be kept on hand for each type of refrigerant. Conventional recycling and reclamation equipment utilize vapor pumps to convey vaporous refrigerant. Vapor pumps utilize lubricants which are generally compatible with a single refrigerant type. Therefore, conventional recycling and reclamation equipment is dedicated to recycling only one refrigerant type.

It would be greatly advantageous to have a refrigerant recycling system which could be more easily adapted to operate on all types of refrigerants.

SUMMARY OF THE INVENTION

It is therefore an object of the present invention to provide a general purpose refrigerant recycling system which can be easily adapted to reclaim a wide variety of refrigerants.

It is a further object of the invention to provide the above described system in a logical arrangement which utilizes a minimum number of parts, and can be made at a minimum manufacturing cost.

It is yet another object of the present invention to provide a refrigerant recycling system which is extremely efficient in operation, and is extremely effective (allowing maximum recovery of the refrigerant in the system which refrigerant is in full compliance with regulatory standards).

The above-described objects are intended to be exemplary but non-limiting. Other objects may become apparent and like embodiments may be practiced without departing from the spirit and scope of the invention. For example, the invention can easily be adapted to operate on all types of air conditioning and refrigeration systems, and should not be limited to automotive systems.

According to the present invention, the above-described and other objects are accomplished by providing a method and apparatus for purifying refrigerant.

The method comprises the steps of cooling a first reservoir to a first temperature, heating a second reservoir to a second temperature, the second reservoir being in fluid communication with the first reservoir through a liquid pump, flowing refrigerant into the first reservoir and allowing the refrigerant to cool to the first temperature, the decrease in refrigerant temperature causing moisture to precipitate from the refrigerant, extracting the precipitant moisture, flowing the refrigerant into the second reservoir and allowing the refrigerant to warm to the second temperature, the increase in temperature causing non-condensible contaminants in said refrigerant to generate a pressure greater than a saturation pressure of said refrigerant, and venting the non-condensable contaminants out of the second reservoir leaving purified refrigerant therein. The purified refrigerant can then be conveniently recycled into a refrigeration system or it can be stored for future use.

In addition, an apparatus is provided for performing the above-describe operations. The apparatus comprises an inlet valve for controlling entry of refrigerant, a first reservoir in fluid communication with the inlet valve for accumulating refrigerant, means for cooling the first reservoir and refrigerant to a first temperature, the decrease in refrigerant temperature causing a corresponding pressure decrease within the reservoir, whereby moisture precipitates from the refrigerant, means for extracting the moisture, a second reservoir in fluid communication with the first reservoir, means for warming the second reservoir and refrigerant therein to a second temperature, the increase in temperature causing non-condensible contaminants in said refrigerant to generate a pressure greater than a saturation pressure of said refrigerant, and means for venting the non-condensable contaminants out of the second reservoir leaving purified refrigerant therein.

BRIEF DESCRIPTION OF THE DRAWINGS

Other objects, features and advantages of the present invention will become more apparent from the following detailed description of preferred embodiments and certain modifications thereof when taken together with the accompanying drawings, in which.

DETAILED DESCRIPTION OF THE PREFERRED EMBODIMENT

Figure 1:
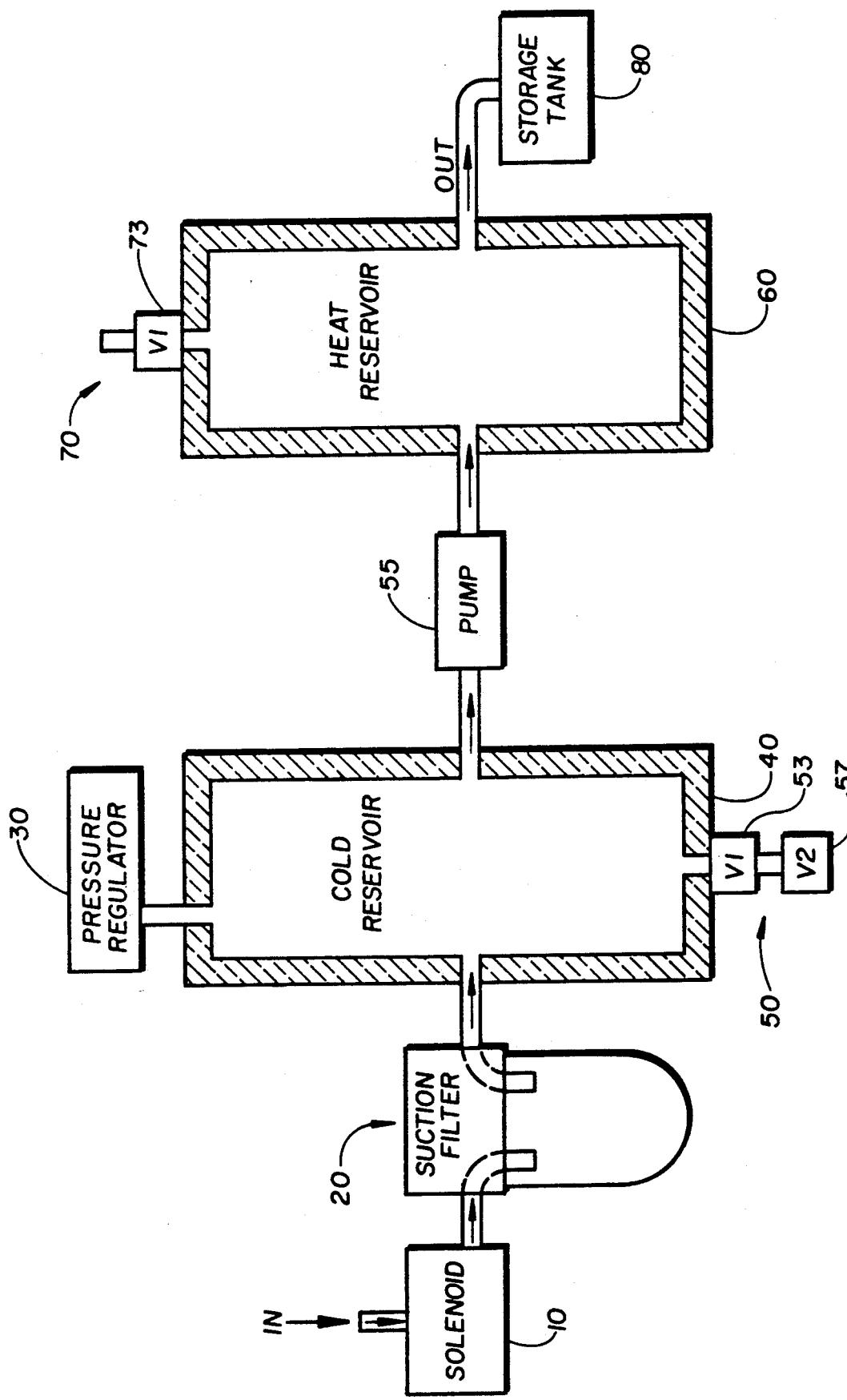
FIG. 1 discloses a detailed block diagram of one embodiment of the present invention.

FIG. 1 illustrates a first embodiment of the present invention which incorporates the basic operating principle.

The invention is preferably connected directly to a refrigeration system via a conventional coupling (not shown). Once connected, the invention is in fluid communication with the refrigeration system and refrigerant may be extracted therefrom. The refrigerant enters the invention through solenoid 10 when the solenoid is opened. Solenoid 10 may be operated directly by an operator, or it may be electrically operated by a control circuit (not shown). The control circuit may be an analog or digital processor, or a computer used for controlling the overall sequence of operations in the invention. The control circuit may also control the flow rate of refrigerant into the invention. Solenoid 10 is in fluid communication with a conventional suction filter 20 which filters oil, particulates and other contaminants from the refrigerant Suction filter 20 includes a reservoir for collecting the filtered contaminants. Suction filter 20 is in turn in fluid communication with a cold reservoir 40. Cold reservoir 40 accumulates a measured amount of refrigerant input from the refrigeration system through solenoid 10 and suction filter 20. Solenoid 10 is closed when it is determined that the proper amount of refrigerant has been accumulated, or that the refrigeration system being serviced is empty of refrigerant. Cold reservoir 40 is maintained at a fixed low temperature and pressure for reducing the temperature and pressure of the refrigerant contained therein.

Cold reservoir 40 may be provided with a pressure regulator 30 for regulating the pressure within cold reservoir 40. When pressure regulator 30 senses a high-pressure condition it momentarily closes solenoid 10, thereby stopping the inflow of refrigerant and lowering the pressure in reservoir 40. Pressure regulator 30 includes a pressure sensor for monitoring the internal pressure of cold reservoir 40 and, in addition, a means for closing solenoid 10 when a high-pressure condition is detected. Alternatively, pressure information from the pressure sensor may be sent to the control circuit (not shown), which processes the information and controls solenoid 10 accordingly.

Cold reservoir 40 is also provided with a drain 50 for draining a measured amount of liquid. Drain 50 includes valves 53 and 57 which are sequentially operated to drain the measured amount of liquid from within reservoir 40 without affecting the internal pressure. Valve 53 may be a conventional electrically controlled valve which distinguishes the liquid to be drained on the basis of its conductivity. Alternatively, valve 53 may be manually operated to drain a visually determined amount of liquid. Once the liquid has been drained, it can be emptied from drain 50 through valve 57, which also may be electrically or manually operated. Cold reservoir 40 is also in fluid communication with a hot reservoir 60 through a pump 55. Pump 55 acts to pump refrigerant from cold reservoir 40 into hot reservoir 60 when the refrigerant in cold reservoir 40 attains a predetermined level. The level of refrigerant in cold reservoir 40 may be determined by a conventional float (not shown), and the refrigerant level can be communicated to the control circuit which initiates operation of the pump 55.

Hot reservoir 60 is provided with a vent 70 for venting gas and vapor. Vent 70 operates to remove gas and vapor from within hot reservoir 60 until the internal pressure drops to a predetermined value established from the known saturation pressure-temperature relationship of the refrigerant. Vent 70 is provided with a valve 73 for venting non-condensable gasses to the atmosphere (or to a storage tank, etc.).

Hot reservoir 60 is also provided with an outlet for removing the purified refrigerant to a storage tank, or back into the refrigeration system. In operation, the recycling system is first attached to an air conditioning or refrigeration unit in need of service. Solenoid 10 is open and the refrigerant flows through a conventional suction filter 20, which removes oil and particulates from the refrigerant. The refrigerant is drawn through suction filter 20 and into cold reservoir 40 by the low pressure condition existing in cold reservoir 40. Pressure regulator 30 regulates the pressure in cold reservoir 40 by cycling solenoid 10 to prevent excessive flow which would prevent the proper extraction of water. Cold reservoir 40 and hot reservoir 60 operate to remove moisture and other contaminants from the refrigerant by taking advantage of the constant pressure/temperature ratio (P/T) at saturation, which is unique to all fluids.

Figure 5:
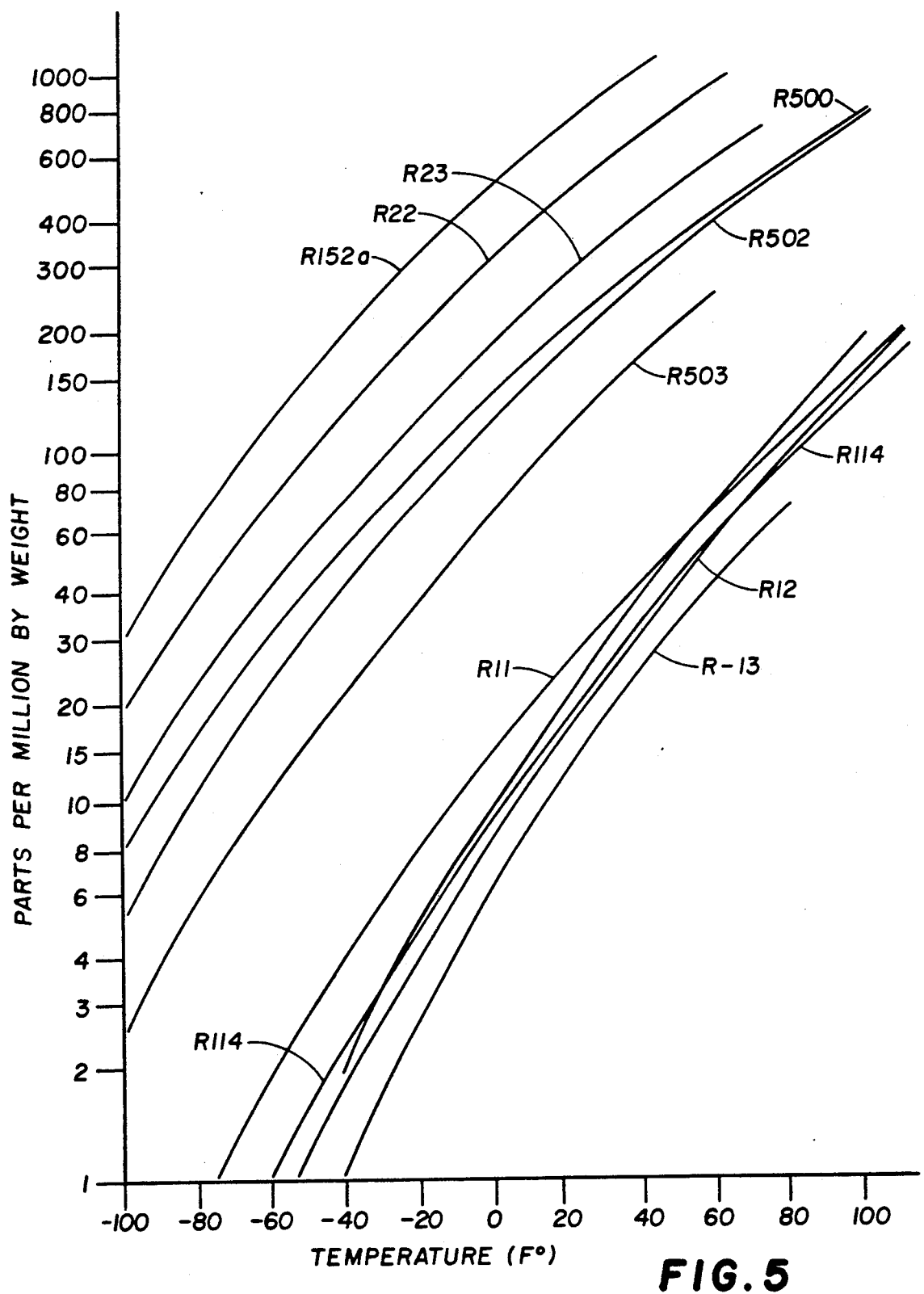
FIG. 5 is a graphical illustration of the solubility of water in various refrigerants as a function of refrigerant temperature.

FIG. 5 illustrates that water absorbed in the refrigerant will precipitate from the refrigerant at temperatures below 19° F. (see FIG. 5). Therefore, the temperature is reduced in cold reservoir 40 to a level which causes precipitation of moisture from the refrigerant. The moisture settles because it is heavier than refrigerant, and it is drained away by drain 50. The valves 53 and 57 orchestrate the timing of moisture removal. Once the moisture has been removed from the refrigerant, the refrigerant is pumped into hot reservoir 60 via pump 55. Hot reservoir 60 is designed to remove all non-condensable gas contaminants from the refrigerant. The hot reservoir is maintained at a high fixed temperature and pressure (preferably, the temperature of R12 would be raised to approximately 137° F., and the pressure would rise to approximately 200 PSIG). The presence of non-condensable gasses would result in a pressure in excess of 200 PSIG, and the non-condensable gasses are vented away from hot reservoir 60 through vent 70 upon operation of valve 73. Hot reservoir 60 is vented until the internal pressure equals the pressure of the refrigerant. The gas and vapor vented from hot reservoir 60 will include all non-condensible contaminants. At this point, the refrigerant has been cleaned of oil, particulates, moisture and non-condensable gasses. The refrigerant can now be stored in storage tank 80 or it can be pumped directly back into the refrigeration or air conditioning system from which it was removed. A primary advantage of the above described system lies in the logical sequence of operations performed on the refrigerant. The operations rely on the inherent property of refrigerants wherein pressure and temperature effect the absorption characteristics of moisture and non-condensable gasses in the liquid phase. The logical sequence makes it possible to perform the recycling operation with a simple transfer of heat from cold reservoir 40 to hot reservoir 60. This eliminates the need for costly compressors and the support equipment needed to operate such compressors. Furthermore, the system can be adapted for use on any refrigerant simply by altering the pressure temperature parameters for cold reservoir 40 and hot reservoir 60.

Figure 2:
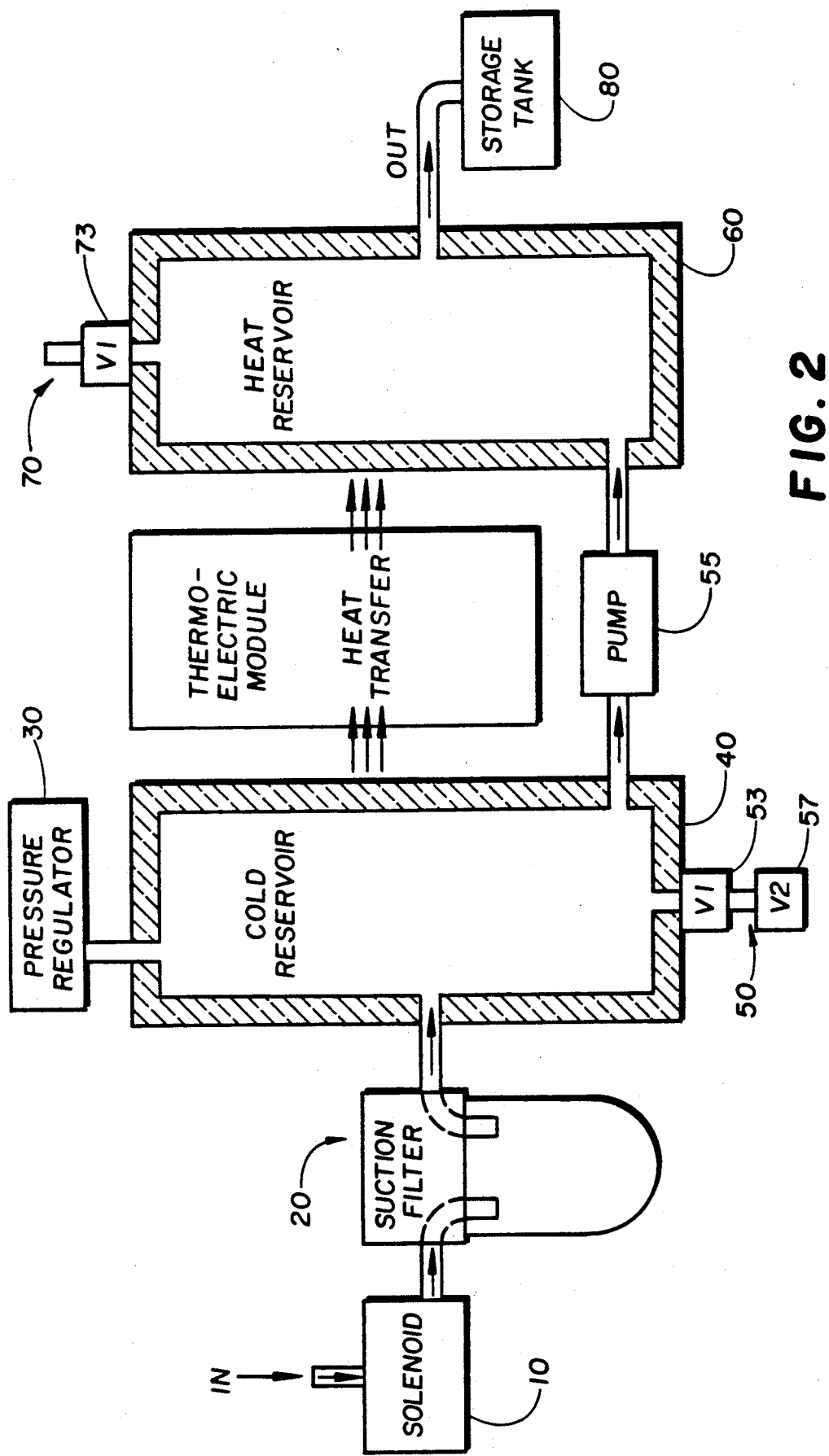
FIG. 2 discloses a detailed block diagram of a second embodiment incorporating the features of FIG. 1 and, additionally, a thermoelectric module 100 for transferring heat.

FIG. 2 discloses a second embodiment incorporating the features of FIG. 1 and, in addition, a means for maintaining the temperature differential between cold reservoir 40 and hot reservoir 60. It is well known that a voltage potential applied across opposing metal plates having different compositions results in a temperature differential. This is commonly known as the Reverse Seebeck Effect. The temperature of one plate will rise while the temperature of the second plate falls. This is the principal on which thermoelectric cells operate. The device shown in FIG. 2 incorporates a thermoelectric module 100 between cold reservoir 40 and hot reservoir 60. Thermoelectric module 100 transfers heat from cold reservoir 40 to hot reservoir 60. Thermoelectric module 100 may comprise a single thermoelectric cell, or alternatively, a number of series-connected thermoelectric cells as necessary for creating the proper temperature differential. By use of thermoelectric module 100, cold reservoir 40 and hot reservoir 60 can be maintained at the necessary temperatures.

Figure 3:
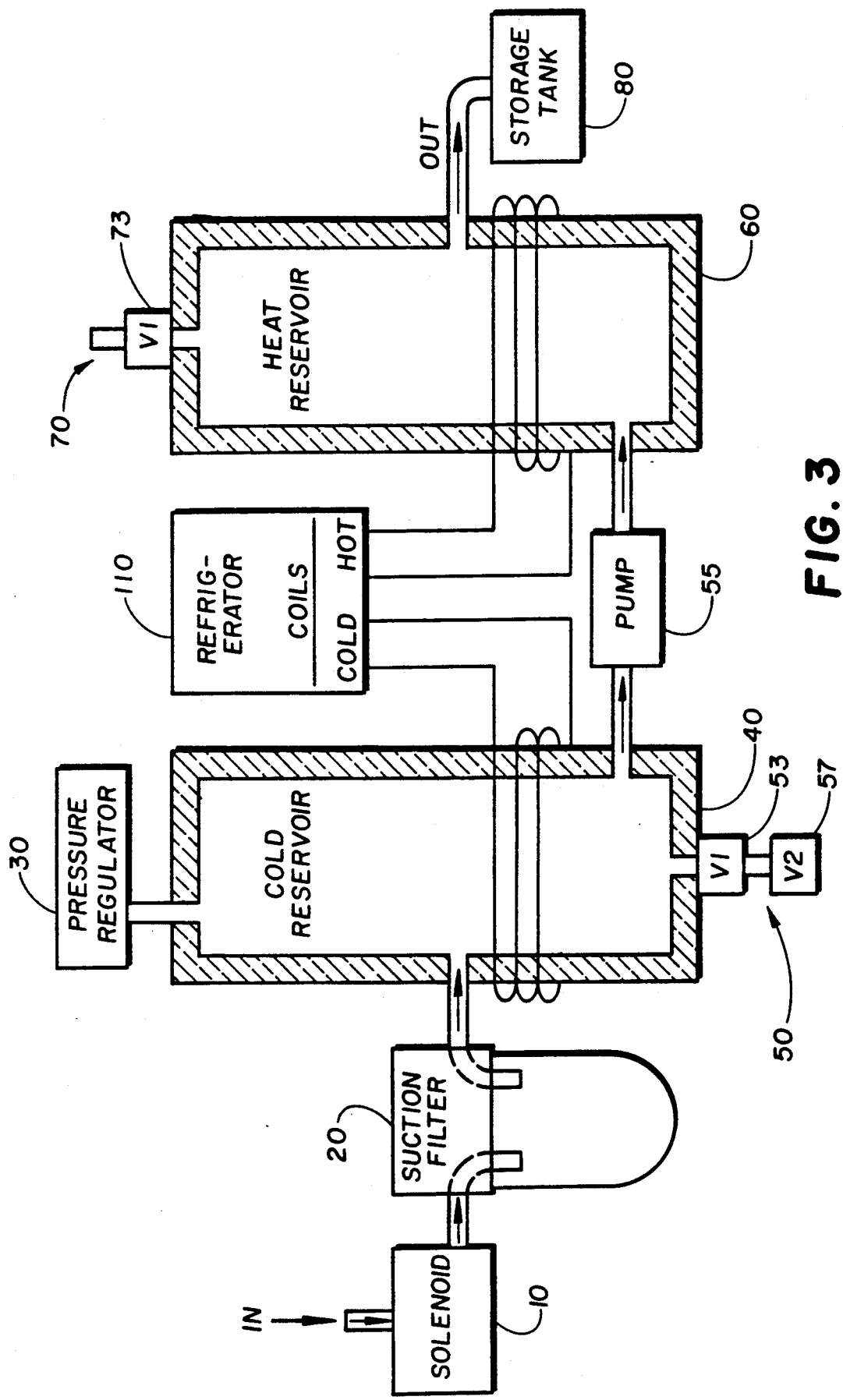
FIG. 3 discloses a detailed block diagram of a third embodiment incorporating the features of FIG. 1 and, in addition, a refrigerator 110 for transferring heat.

FIG. 3 discloses an alternate means for cooling and heating the respective cold reservoir 40 and hot reservoir 60. A conventional refrigerator 110 is provided with cooling coils encircling the cold reservoir 40. Refrigerator 110 is also provided with heating coils encircling hot reservoir 60. The refrigerator 110 operates in a conventional manner to transfer heat from the cold reservoir 40 to hot reservoir 60.

Figure 4:
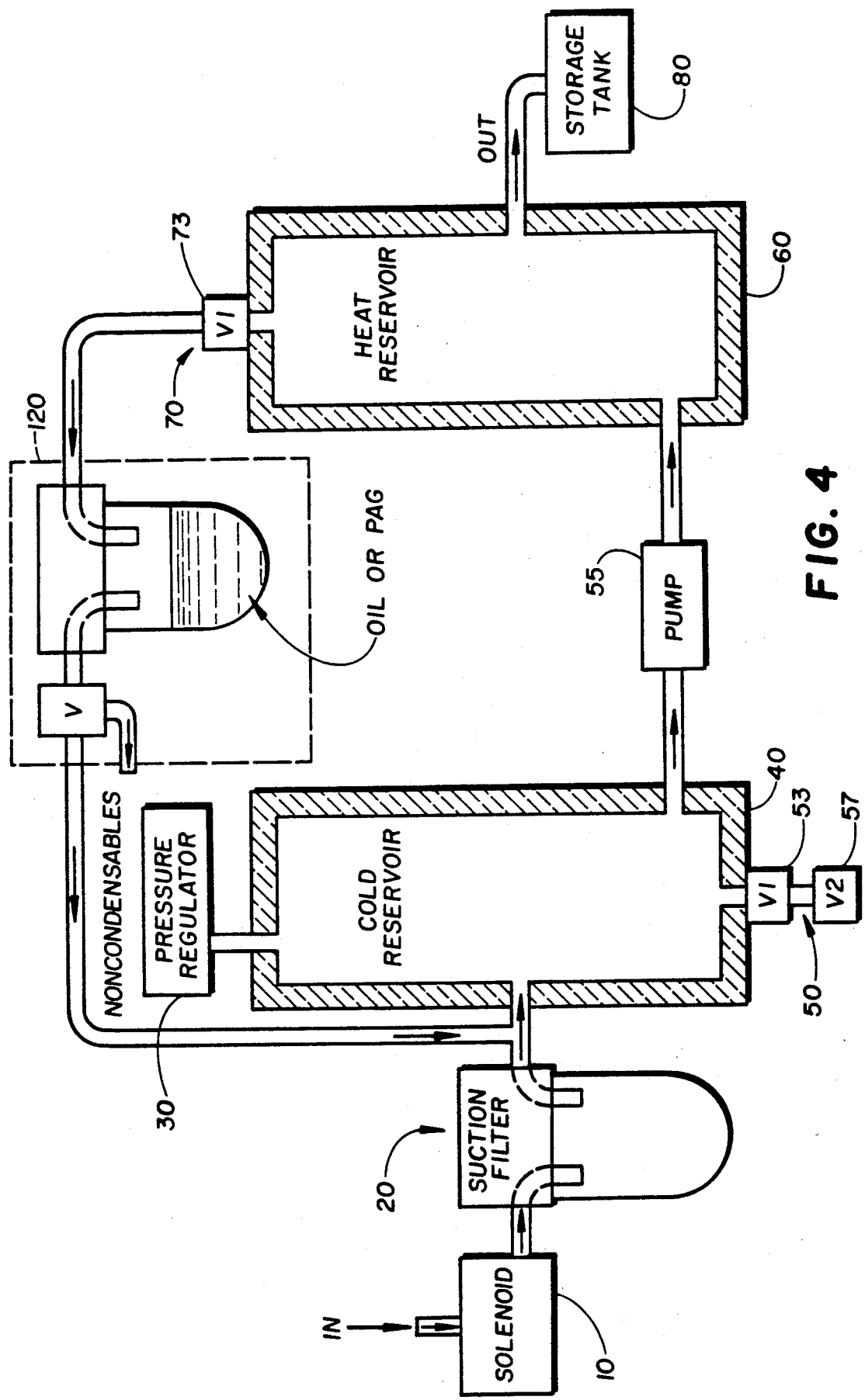
FIG. 4 discloses a detailed block diagram of a fourth embodiment incorporating the features of FIG. 1 and, in addition, a refrigerant filter 120 for improving the reclamation efficiency of the apparatus.
Figure 6:
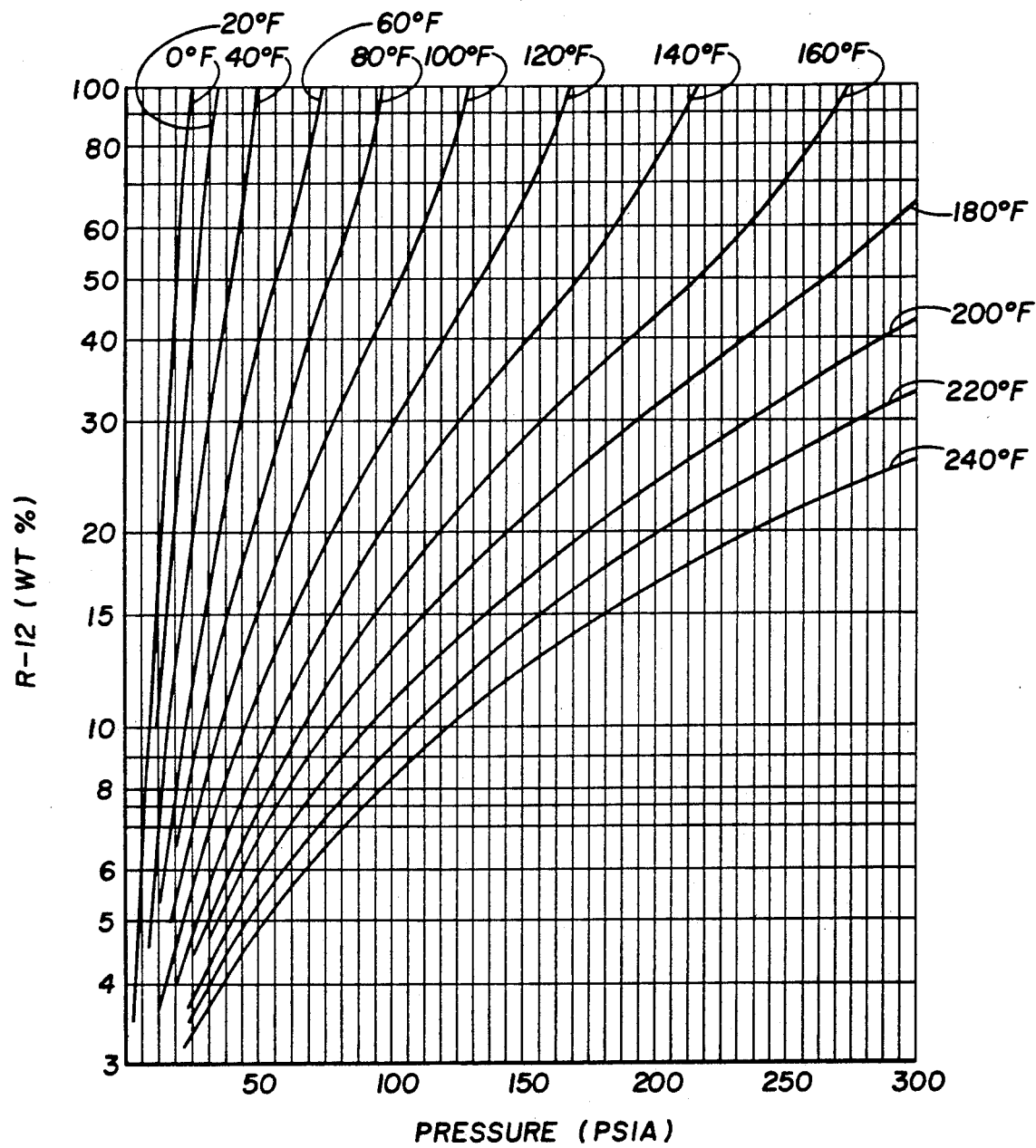
FIG. 6 is a graphical illustration of the solubility of R12 refrigerant in oil as a function of temperature and pressure.

FIG. 4 discloses another embodiment of the invention which includes a refrigerant filter 120 in fluid communication between the hot reservoir 60 and cold reservoir 40. Refrigerant filter 120 is provided with a reservoir containing an amount of oil or other liquid which is miscible with the particular type of refrigerant being recycled. It has been found that approximately twenty percent (20%) of the gas vented from hot reservoir 60 by means of vent 70 is vaporized refrigerant. It is possible to salvage this refrigerant by flowing the gas vented from hot reservoir 60 into refrigerant filter 120. FIG. 6 illustrates that the solubility of refrigerant in oil is a function of pressure. The pressure in refrigerant filter 120 can be increased to cause the refrigerant to be absorbed in the oil. The gas contaminants are then vented out of refrigerant filter 120. After this, refrigerant filter 120 is depressurized in order to separate the refrigerant from the oil. The salvaged refrigerant is then be directed back into cold reservoir 40. This feature increases the recycling efficiency of the overall system. As in the other embodiments, this embodiment can be adapted for use on any refrigerant simply by altering the pressure temperature parameters for cold reservoir 40 and hot reservoir 60, and by using the proper fluid in refrigerant filter 120. For example, as required in R134A refrigeration systems, polyalkalineglycol can be used in place of oil since there are no copper coated compressor parts exposed to the PAG.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A method of purifying substantially any species of refrigerant, which comprises:
    cooling a first reservoir to a first temperature;
    heating a second reservoir to a second temperature, said second reservoir being in fluid communication with said first reservoir;
    flowing refrigerant into said first reservoir and allowing said refrigerant to cool to said first temperature, said decrease in refrigerant temperature causing moisture to precipitate from a liquid portion of said refrigerant in said first reservoir;
    purifying said refrigerant by extracting said moisture from said first reservoir;
    flowing said refrigerant into said second reservoir and allowing said refrigerant to warm to said second temperature, said increase in temperature causing non-condensable contaminants in a vaporous portion of said refrigerant to generate a pressure greater than a saturation pressure of said refrigerant; and
    purifying said refrigerant by venting said non-condensable contaminants out of said second reservoir.

2. The method according to claim 1, wherein said flowing of refrigerant into said first reservoir is induced by a pressure decrease corresponding to said decrease in temperature within said first reservoir.

3. The method according to claim 1, further comprising the step of flowing said refrigerant through a suction filter for removing oil and particulates therefrom.

4. A method of purifying substantially any species of refrigerant, which comprises:
    a first step of flowing refrigerant into a first reservoir;
    a second step of cooling said refrigerant to a first temperature, said decrease in refrigerant temperature causing moisture to precipitate from a liquid portion of said refrigerant in said first reservoir;
    a third step of purifying said refrigerant by extracting said precipitant moisture from said first reservoir;
    a fourth step of flowing said refrigerant into a second reservoir;
    a fifth step of warming said refrigerant to a second temperature, said increase in temperature causing non-condensible contaminants in said refrigerant to generate a pressure greater than a saturation pressure of said refrigerant; and
    a sixth step of further purifying said refrigerant by venting said non-condensable contaminants out of said second reservoir.

5. The method according to claim 4, further comprising a seventh step of flowing said refrigerant out of said second reservoir and into a storage tank.

6. The method according to claim 4, wherein said first step includes flowing said refrigerant out of an enclosed flow refrigerant system.

7. The method according to claim 4, wherein said first step of flowing said refrigerant into said first reservoir is by induction caused by a pressure decrease corresponding to said decrease in temperature within said first reservoir.

8. A method for purifying substantially any species of refrigerant, which comprises:
    a first step of flowing refrigerant through a suction filter for removing oil and particulates therefrom;
    a second step of flowing said refrigerant into a first reservoir;
    a third step of cooling said refrigerant to a first temperature, said decrease in refrigerant temperature causing moisture to precipitate from a liquid portion of said refrigerant in said first reservoir;

a fourth step of purifying said refrigerant by extracting said precipitant moisture;

a fifth step of flowing said refrigerant into a second reservoir;

a sixth step of warming said refrigerant to a second temperature, said increase in temperature causing non-condensible contaminants in said refrigerant to generate a pressure greater than a saturation pressure of said refrigerant; and a seventh step of further purifying said refrigerant by venting said non-condensable contaminants out of said second reservoir.

9. The method according to claim 8, further comprising an eighth step of flowing said refrigerant out of said second reservoir and into a storage tank.

10. The method according to claim 8, wherein said first step includes flowing said refrigerant out of an enclosed flow refrigeration system.

11. The method according to claim 10, further comprising an eighth step of flowing said refrigerant out of said second reservoir and into a storage tank.

12. The method according to claim 10, further comprising an eighth step of flowing said refrigerant out of said second reservoir back into said enclosed flow refrigeration system.

13. The method according to claim 8, wherein said first step of flowing said refrigerant through a suction filter, and said second step of flowing said refrigerant into said first reservoir are by induction caused by a pressure decrease corresponding to said decrease in temperature within said first reservoir.

14. A method of purifying substantially any species of refrigerant, which comprises:

a first step of transferring heat from a first reservoir to a second reservoir, thereby cooling said first reservoir to a first temperature and warming said second reservoir to a second temperature;

a second step of flowing refrigerant into said first reservoir and allowing said refrigerant to cool to said first temperature, said decrease in refrigerant temperature causing moisture to precipitate from a liquid portion of said refrigerant in said first reservoir;

a third step of purifying said refrigerant by extracting said precipitant moisture;

a fourth step of flowing said refrigerant into said second reservoir and allowing said refrigerant to warm to said second temperature, said increase in temperature causing non-condensable contaminants in said refrigerant to generate a pressure greater than a saturation pressure of said refrigerant; and a fifth step of further purifying said refrigerant by venting said non-condensable contaminants out of said second reservoir.

15. The method according to claim 14, further comprising a sixth step of flowing said refrigerant out of said second reservoir and into a storage tank.

16. The method according to claim 14, wherein said second step includes flowing said refrigerant out of an enclosed flow refrigeration system.

17. The method according to claim 14, wherein said second step of flowing said refrigerant into said first reservoir is by induction caused by a pressure decrease corresponding to said decrease in temperature within said first reservoir.

18. A method for purifying substantially any species of refrigerant, which comprises:

cooling a first reservoir to a first temperature, thereby causing a corresponding pressure decrease within said first reservoir;

warming a second reservoir to a second temperature;

flowing refrigerant into said first reservoir by induction caused by said pressure decrease within said first reservoir;

allowing said refrigerant to cool to said first temperature, the decrease in temperature causing moisture to precipitate from a liquid portion of said refrigerant in said first reservoir;

purifying said refrigerant by extracting said precipitant moisture;

pumping said refrigerant from said first reservoir into said second reservoir;

allowing said refrigerant to warm to said second temperature, said increase in temperature causing non-condensible contaminants in said refrigerant to generate a pressure greater than a saturation pressure of said refrigerant; and purifying said refrigerant by venting said non-condensable contaminants out of said second reservoir.

19. The method according to claim 18, further comprising regulating said pressure decrease in said first reservoir for controlling said inductive flowing of said refrigerant into said first reservoir.

20. The method according to claim 18, further comprising flowing said refrigerant out of said second reservoir and into a storage tank.

21. The method according to claim 18, wherein said flowing refrigerant into said first reservoir includes flowing said refrigerant out of an enclosed flow refrigeration system.

22. A method of purifying substantially any species of refrigerant, which comprises:

flowing refrigerant into a first reservoir;

cooling said refrigerant to a first temperature, said decrease in refrigerant temperature causing moisture to precipitate from a liquid portion of said refrigerant in said first reservoir;

purifying said refrigerant by extracting said precipitant moisture;

flowing said refrigerant into a second reservoir;

warming said refrigerant to a second temperature, said increase in temperature causing non-condensible impurities in a first vaporous portion of said refrigerant to generate a pressure greater than a saturation pressure of said refrigerant; and purifying said refrigerant by venting said second reservoir until an internal pressure of said second reservoir is substantially equal to said refrigerant saturation pressure, whereby said non-condensible impurities are vented from said second reservoir;

recovering a second portion of refrigerant vapor vented along with said non-condensible impurities, said vapor recovery comprising the additional steps of, flowing said non-condensible impurities and second portion of refrigerant vapor into a refrigerant filter, said refrigerant filter having a third reservoir containing a fluid miscible with refrigerant, increasing a pressure within said refrigerant filter for causing absorption of said second portion of refrigerant vapor into said fluid, purifying said second portion of refrigerant by venting said refrigerant filter for removing said non-condensable impurities therefrom, decreasing said pressure in said refrigerant filter to cause separation of said second portion of refrigerant from said fluid, and flowing said purified second portion of refrigerant back into said first reservoir.

23. The method according to claim 22, further comprising flowing said refrigerant out of said second reservoir and into a storage tank.

24. The method according to claim 22, wherein said step of flowing refrigerant into said first reservoir includes flowing said refrigerant out of an enclosed flow refrigeration system.

25. The method according to claim 22, wherein said step of flowing said refrigerant into said first reservoir is by induction caused by a pressure decrease corresponding to said decrease in temperature within said first reservoir.

26. An apparatus for purifying substantially any species of refrigerant, comprising:

an inlet valve for controlling entry of refrigerant;

a first reservoir in fluid communication with said inlet valve for accumulating refrigerant;

means for cooling said first reservoir and refrigerant to a first temperature, said decrease in refrigerant temperature causing moisture to precipitate from a liquid portion of said refrigerant in said first reservoir;

means for purifying said refrigerant by extracting said moisture from said first reservoir;

a second reservoir in fluid communication with said first reservoir;

means for warming said second reservoir and refrigerant therein to a second temperature, said increase in temperature causing non-condensible contaminants in said refrigerant to generate a pressure greater than a saturation pressure of said refrigerant;

means for purifying said refrigerant by venting said non-condensable contaminants out of said second reservoir.

27. The apparatus according to claim 26, wherein refrigerant is inducted into said first reservoir by a pressure decrease corresponding to said decrease in temperature in said first reservoir.

28. The apparatus according to claim 27, further comprising a pressure regulator operating to regulate said pressure decrease in said first reservoir for controlling the inductive flow of refrigerant into said first reservoir.

29. An apparatus for purifying substantially any species of refrigerant, comprising:

an inlet valve for controlling entry of refrigerant;

a suction filter in fluid communication with said inlet valve for removing oil and particulates from said refrigerant;

a first reservoir in fluid communication with said inlet valve for accumulating said refrigerant;

a second reservoir in fluid communication with said first reservoir;

temperature regulating means for cooling said first reservoir and refrigerant to a first temperature whereby moisture precipitates from a liquid portion of said refrigerant, said temperature regulating means also warming said second reservoir and refrigerant therein to a second temperature, said increase in temperature causing non-condensible contaminants in said refrigerant to generate a pressure greater than a saturation pressure of said refrigerant;

means for purifying said refrigerant by extracting said moisture from said first reservoir;

means for purifying said refrigerant by venting said non-condensable contaminants out of said second reservoir.

30. The apparatus according to claim 29, further comprising a pump interposed between said first reservoir and second reservoir for pumping refrigerant therebetween.

31. The apparatus according to claim 29, wherein said temperature regulating means is a refrigerator for causing a heat transfer from said first reservoir to said second reservoir, said refrigerator having an evaporator for cooling said first reservoir, and a condenser for heating said second reservoir 32. The apparatus according to claim 29, wherein said temperature regulating means is a thermoelectric module for causing a transfer of heat from said first reservoir to said second reservoir.

33. The apparatus according to claim 29, wherein refrigerant is inducted into said first reservoir through said suction filter when said inlet valve is opened, said induction caused by a pressure decrease corresponding to said decrease in temperature in said first reservoir.

34. The apparatus according to claim 33, further comprising a pressure regulator operating to regulate said pressure decrease in said first reservoir for controlling the inductive flow of refrigerant into said first reservoir.

35. An apparatus for purifying substantially any species of refrigerant, comprising:

an inlet valve for controlling entry of refrigerant;

a first reservoir in fluid communication with said inlet valve for accumulating refrigerant;

means for cooling said first reservoir and refrigerant to a first temperature, said decrease in refrigerant temperature causing moisture to precipitate from a liquid portion of said refrigerant;

means for purifying said refrigerant by extracting said moisture from said first reservoir;

a second reservoir in fluid communication with said first reservoir;

means for warming said second reservoir and refrigerant therein to a second temperature, said increase in temperature causing non-condensible contaminants in a first vaporous portion of said refrigerant to generate a pressure greater than a saturation pressure of refrigerant;

means for purifying said refrigerant by venting said second reservoir to said saturation pressure, thereby venting said non-condensable impurities out of said second reservoir;

means for recovering a second vaporous portion of refrigerant vented along with said non-condensible impurities.

36. The apparatus according to claim 35, wherein said refrigerant recovery means for recovering said second vaporous portion of further comprises, a refrigerant filter in fluid communication with said second reservoir venting means, said refrigerant filter having a third reservoir containing a fluid miscible with refrigerant, pressure control means for increasing pressure within said refrigerant filter thereby causing absorption of said second vaporous portion of refrigerant into said fluid, and for decreasing said pressure in said refrigerant filter to cause separation of refrigerant from said fluid, a vent for venting said refrigerant filter while said second vaporous portion of refrigerant is absorbed in said fluid, thereby removing said non-condensable impurities, means for flowing said filtered refrigerant back into said first reservoir after said non-condensible impurities are removed.

37. The apparatus according to claim 35, wherein refrigerant is inducted into said first reservoir by a pressure decrease corresponding to said decrease in refrigerant temperature in said first reservoir.

38. The apparatus according to claim 35, further comprising a pressure regulator operating to regulate said pressure decrease in said first reservoir for controlling the inductive flow of refrigerant into said first reservoir.

39. The apparatus according to claim 35, further comprising a suction filter interposed between said inlet valve and first reservoir for removing oil and particulates from said refrigerant.

40. The apparatus according to claim 39, further comprising a pump interposed between said first reservoir and said second reservoir for pumping refrigerant therebetween.

* * * * *